K. P. WEBB.
ICE CREAM FREEZER.
APPLICATION FILED FEB. 24, 1915.
1,183,929.
Patented May 23, 1916.
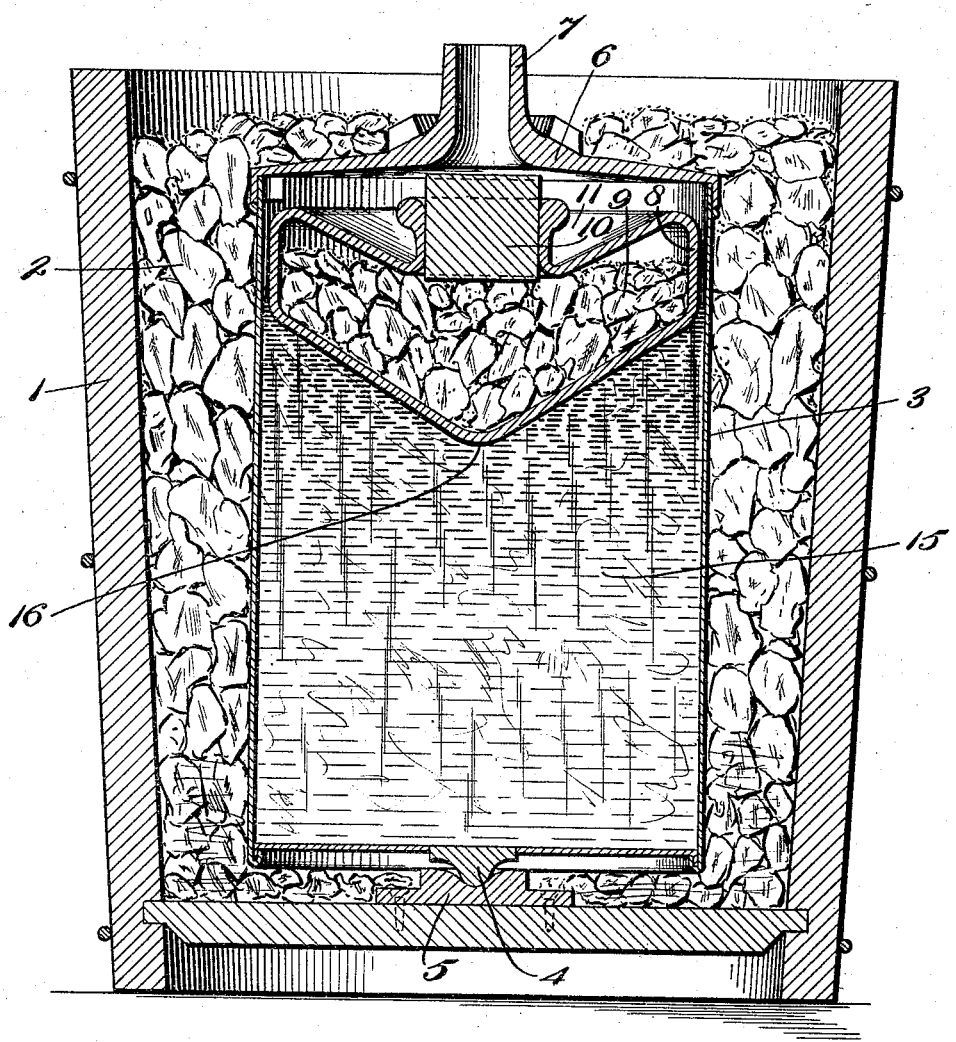
Witnesses
W. C. Fielding.
Byron B. Collings.
Inventor
K. P. Webb by
T. W. Witherspoon
Attorney

UNITED STATES PATENT OFFICE.

KATE PRATT WEBB, OF PORTSMOUTH, VIRGINIA.

ICE-CREAM FREEZER.

1,183,929.      Specification of Letters Patent.      Patented May 23, 1916.

Application filed February 24, 1915. Serial No. 10,168.

*To all whom it may concern:*

Be it known that I, KATE PRATT WEBB, a citizen of the United States, residing at Portsmouth, in the county of Norfolk and State of Virginia, have invented certain new and useful Improvements in Ice-Cream Freezers; and I do hereby declare the following to be a full, clear, and exact description of the invention, such as will enable others skilled in the art to which it appertains to make and use the same.

This invention relates to improvements in ice cream freezers, and has for its object to provide a means for keeping the ice cream refrigerated at all times, after it has been made, in a manner more efficient and less costly than has heretofore been proposed.

With these and other objects in view the invention consists in the novel details of construction and combinations of parts more fully hereinafter disclosed and particularly pointed out in the claims.

Referring to the accompanying drawing in which the figure is a diagrammatic sectional view of an ice cream freezer provided with my improvement, 1 indicates any suitable receptacle, 2 the ice or other refrigerant contained in said receptacle, 3 any suitable container for the ice cream located in the receptacle 1, 4 a pivot for the receptacle 3 resting on the base piece 5 carried by the bottom of the receptacle 1, 6 any suitable cover for the receptacle 3 and 7 any suitable connection between the cover 6 and a means not shown for rotating the receptacle 3.

Inside the receptacle 3 I provide a receptacle 8 of any suitable size or shape, but preferably of the shape shown, and which is sufficiently smaller than the receptacle 3 in order to permit it to be readily placed in said receptacle 3 and removed therefrom. The receptacle 8 is hollow as shown and is adapted to receive ice and salt 9 in order to maintain a low temperature therein; and it is preferably provided with any suitable closure, such as the stopper 10, or it of course may be provided with a screwed cap or other closure not shown. The upper wall of the receptacle 8 is preferably depressed as at 11 in order to enable it to hold ice or other refrigerant and thereby aid in maintaining the low temperature on the inside of the receptacle 3.

In operation, the materials to be frozen may be placed in the receptacle 3 in the usual way and the ice cream congealed. Or the receptacle 8 may be placed inside the receptacle 3, along with the materials to be frozen, and the ice cream made with the said receptacle 8 in place. In either case after the ice cream is congealed the receptacle 8 is located on top of the ice cream, and is maintained substantially full of ice, or ice and salt, so that the top portion of the ice cream 15 is always maintained solid or firm. In this way the ice cream may be used or taken out of the receptacle 3 from time to time, and the receptacle 8 placed back inside said receptacle 3 so that that portion of the ice cream which remains in the receptacle is always found to be firm and solid and therefore the house keeper is assured of having the ice cream in a solid and firm condition no matter how long it may have been used from the receptacle. The said receptacle 8 being of smaller size than the receptacle 3, it naturally follows down inside the walls of the receptacle 3 as the ice cream is used therefrom, and consequently it serves to freeze the top portions of the ice cream left in the receptacle 3 up to the very end.

Accordingly it follows that a house keeper using this invention can materially save in the amount of ice heretofore required in maintaining the ice cream in a solid condition because a relatively small quantity of ice placed in the receptacle 8 is more efficient in maintaining the top of the ice cream solid than is a larger quantity of ice such as 2 which is placed around the upper and empty end of the receptacle 3. In other words when the ice is placed in the receptacle 8 a less quantity is required to get the same freezing effect on the top of the ice cream than is the case when the ice is placed on the outside of the receptacle 3 and above the level of the ice cream.

I prefer to have the bottom portion of the receptacle 8 pointed as shown at 16 because it serves to force the ice cream 15 up and around the walls of the receptacle 8, and thereby causes the ice 9 in said receptacle 8 to act more efficiently on the ice cream than would otherwise be the case. Especially is this true when it is remembered that the ice cream being in a more or less semi-solid condition it does not easily lend itself to the making of a close contact with a flat bottom receptacle 8.

It is obvious that those skilled in the art may vary the details of construction as well as the arrangement of parts without departing from the spirit of my invention and therefore I do not wish to be limited to the above disclosure except as may be required by the claims.

What I claim is:

1. In an ice cream freezer the combination of a vessel to hold the ice cream; means for congealing said cream; and a hollow vessel of less diameter and length than said first named vessel adapted to contain ice and salt located inside said first named vessel, and adapted to rest on top of the cream and to be readily placed in and taken out of said first named vessel, substantially as described.

2. A vessel adapted to rest upon and to refrigerate the top layers of ice cream in an ice cream freezer comprising a hollow body portion of a diameter slightly less than the freezer for which it is designed, of a height not greater than its diameter and having an opening through which ice and salt may be entered into said body portion; a closure for said opening; and a depressed outer top wall portion adapted to receive a refrigerating agent, substantially as described.

3. A vessel adapted to rest upon and to refrigerate the top layers of ice cream in an ice cream freezer comprising a hollow body portion of a size smaller than and adapted to loosely fit the freezer for which it is designed so as to freely move up and down inside said freezer; said vessel having an opening through which ice and salt may be entered into said body portion; a closure for said opening; an outer depressed top wall portion adapted to receive a refrigerating agent and an outer tapered bottom portion, substantially as described.

In testimony whereof I affix my signature, in presence of two witnesses.

KATE PRATT WEBB.

Witnesses:
J. A. HUDGINS,
FRANK G. COUSINS.

Copies of this patent may be obtained for five cents each, by addressing the "Commissioner of Patents, Washington, D. C."